United States Patent [19]
Eder

[11] Patent Number: 5,788,442
[45] Date of Patent: Aug. 4, 1998

[54] SEALING ARRANGEMENT FOR BORES

[75] Inventor: Jean Marie Eder, Woerth, France

[73] Assignee: INA Walzlager Schaeffler KG, Germany

[21] Appl. No.: 840,981

[22] Filed: Apr. 21, 1997

[30] Foreign Application Priority Data

Apr. 22, 1996 [DE] Germany .......................... 196 15 708.0

[51] Int. Cl.$^6$ .................................................. A47G 3/00
[52] U.S. Cl. .................................................. 411/373; 411/372
[58] Field of Search .................................. 411/371, 372, 411/373, 377, 60, 57, 44

[56] References Cited

U.S. PATENT DOCUMENTS

| | | |
|---|---|---|
| 2,968,375 | 1/1961 | Avery . |
| 3,921,496 | 11/1975 | Helderman ................... 411/60 |
| 4,708,550 | 11/1987 | Hamilton ................... 411/373 |
| 5,501,559 | 3/1996 | Lenherr ................... 411/373 |

FOREIGN PATENT DOCUMENTS

| | | |
|---|---|---|
| 2239146 | 2/1975 | France . |
| 1880511 | 10/1963 | Germany . |
| 1775670 | 9/1971 | Germany . |
| 3046590 | 7/1982 | Germany . |
| 3109203 | 9/1982 | Germany . |
| 9316349 | 3/1994 | Germany . |
| 9408850 | 10/1994 | Germany . |
| 15153 | 6/1896 | United Kingdom ............ 411/373 |
| 684821 | 12/1952 | United Kingdom . |

*Primary Examiner*—Flemming Saether
*Attorney, Agent, or Firm*—Bierman, Muserlian and Lucas

[57] ABSTRACT

In a sealing arrangement for bores (2) in guide rails (1), particularly for linear assemblies, each bore (2) comprises a radially widened end portion (5) for receiving a screw head (4) of a fixing screw (3) and is adapted to be sealed in a plane parallel to an upper surface (10) of the guide rail (1) by a sealing plug (6) having a disc-shaped upper part (8) and a concentric shank (9), said sealing plug (6) extending in a sealing position in the end portion (5) of the bore (2), characterized in that an annular clamping washer (7) comprising a through-slit (11) in radial direction at one circumferential point is arranged in the end portion (5) between the upper part (8) of the sealing plug (6) and the screw head (4), and the shank (9) of the sealing plug (6) is pressed into a bore (12) of the clamping washer (7) whereby, with the help of the clamping washer (7), the sealing plug (6) is fixed in a simple manner in the end portion (5) of the bore (2) which is thus sealed.

3 Claims, 2 Drawing Sheets

5,788,442

SEALING ARRANGEMENT FOR BORES

FIELD OF THE INVENTION

A sealing arrangement for bores in guide rails, particularly for linear assemblies, the bores comprising a radially widened end portion for receiving a screw head of a fixing screw and being adapted to be sealed in a plane parallel to an upper surface of the guide rail by a sealing plug having a disc-shaped upper part and a concentric shank, said sealing plug extending in a sealing position in the end portion of the bore.

BACKGROUND OF THE INVENTION

Bore sealing plugs are generally pressed into the bores to assure their retention therein which retention is achieved by an over-dimensioning of the sealing plug relative to the bore. To obtain such a press-fit, close tolerances of the mating parts have to be observed to prevent a vaulting of the disc-shaped part of the sealing plug. In a sealing arrangement for bores known from DE-OS 30 46 590, the sealing plugs are at first cooled to below ambient temperature. Since the sealing plugs are slightly overdimensioned, it is possible to insert them into the bores after cooling and the shrinkage resulting therefrom. On a subsequent heating to ambient temperature, the plugs re-expand and get clamped in the bore.

This procedure, however, has not only the drawback that complicated measures are required for cooling the plugs, but additional means have to be provided for retaining them in the bores till they have been heated to ambient temperature. There is also the danger of the plugs tilting in the bores so that the linear motion of a carriage on the guide rail would be impeded and the linear assembly possibly destroyed.

DE-GM 93 16 349 shows an arrangement of the said type in which the sealing plug comprises a concentric shank which, in the mounted state, extends partially into a polygon socket profile of the screw head. The sealing plug is fixed in position in the bore of the guide rail by filling the remaining hollow space of the polygon socket with a hardening material such as a casting resin. This method does indeed permit an excellent fixing of the sealing plug but due to the need of filling the hollow space with the hardening material, it is also much more complicated and expensive.

OBJECTS OF THE INVENTION

It is an object of the invention to provide an extremely simple and easily mountable arrangement for sealing bores in guide rails.

This and other objects and advantages of the invention will become obvious from the following detailed description.

SUMMARY OF THE INVENTION

The invention achieves the above objects by arranging an annular clamping washer comprising a through-slit in radial direction at one circumferential point in the end portion between the upper part of the sealing plug and the screw head, and the shank of the sealing plug is pressed into a bore of the clamping washer. Advantageously, the disc-shaped upper part of the sealing plug is configured with a diameter having a slight play relative to the radially widened end portion of the bore of the guide rail. This arrangement for sealing guide rail bores therefore comprises two elements inserted into the widened end portion of the bore, i.e., the sealing plug and the clamping washer. In the assembled state, the clamping washer bears against the screw head. The concentric shank is pressed into the bore of the clamping washer which is thereby expanded and clamped in the radially widened end portion of the guide rail bore, so that the sealing plug is fixed in position.

The screw head may comprise a hollow space open at one end and having a polygon socket profile into which the shank of the sealing plug projects. This is the case when the axial length of the shank is greater than that of the clamping washer.

BRIEF DESCRIPTION OF THE DRAWINGS

An example of an embodiment of the invention is represented in the drawings and will now be described with reference to the figures.

DETAILED DESCRIPTION OF THE DRAWINGS

Figure 1:
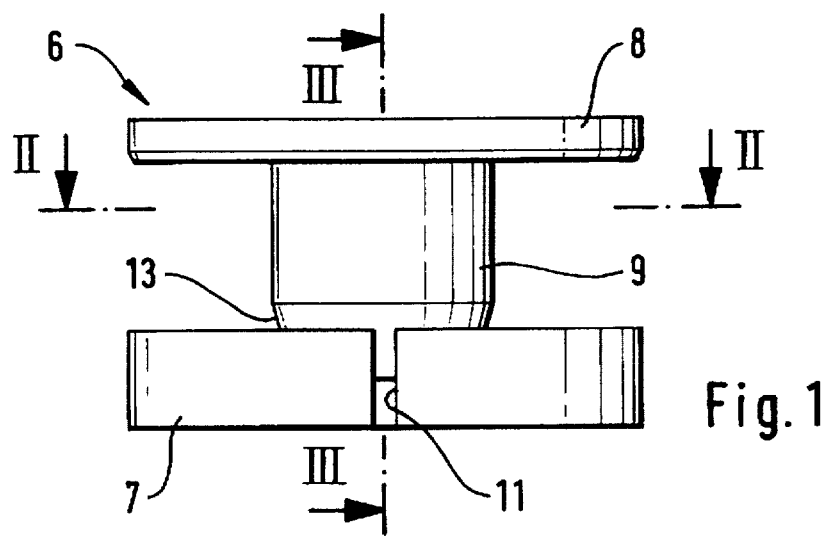
FIG. 1 is a side view of a sealing plug and an adjoining clamping washer of a sealing arrangement of the invention.
Figure 2:
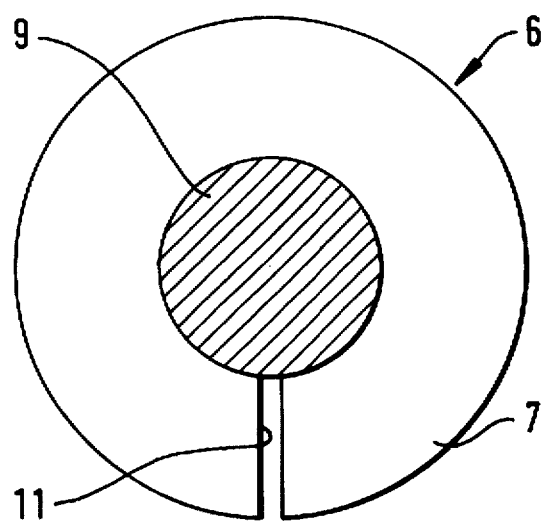
FIG. 2 is a cross-section through the sealing elements taken along line II—II of FIG. 1.
Figure 3:
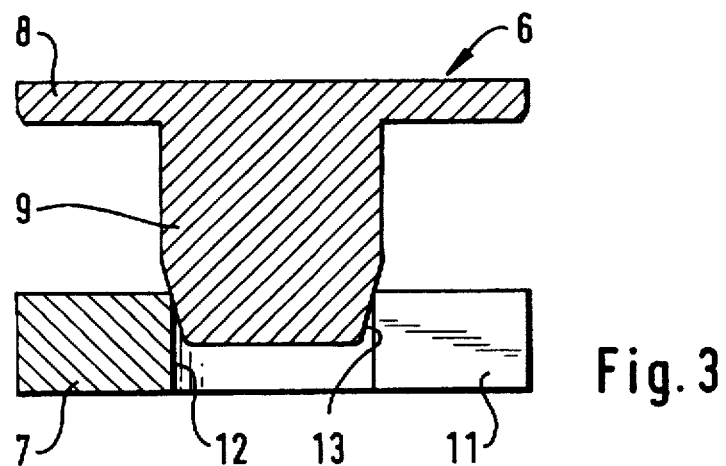
FIG. 3 is a longitudinal cross-section through the sealing elements taken along the line III—III of FIG. 1.
Figure 4:
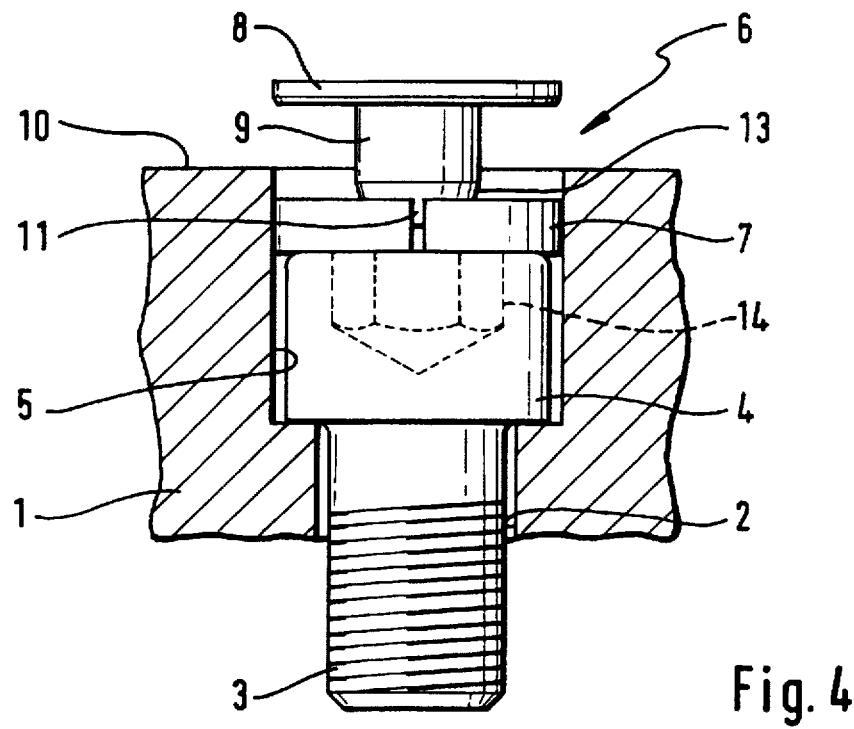
FIG. 4 is a longitudinal cross-section through a bore of a guide rail with a clamping washer inserted therein and an adjoining, not yet pressed-in sealing plug.

For fixing a guide rail 1 to a connecting structure, the guide rail 1 comprises a plurality of bores 2 spaced one behind the other. A fixing screw 3 is inserted into each bore 2 with the screw head 4 of the fixing screw 3 situated in a radially widened end portion 5 of the bore 2. This end portion 5 is also intended to receive sealing elements comprising a sealing plug 6 and a clamping washer 7.

The sealing plug 6 is a one-piece rotationally symmetrical element having a disc-shaped upper portion 8 and a concentric shank 9 projecting therefrom. In the sealed state of the bore 2, the outer end face of the disc-shaped upper portion 8 is situated in the plane of the upper surface 10 of the guide rail 1 from which the radially widened end portion 5 of the bore 2 starts.

The clamping washer 7 is configured as a disc-shaped circular ring having a through-slit in radial direction at one point of its circumference so that it can be radially expanded elastically. In the mounted state, the clamping washer 7 is situated within the end portion 5 of the bore 2 and bears with one end face against the screw head 4. The bore 12 of the clamping washer 7 has a slightly smaller diameter than the shank 9 of the sealing plug 6.

Figure 5:
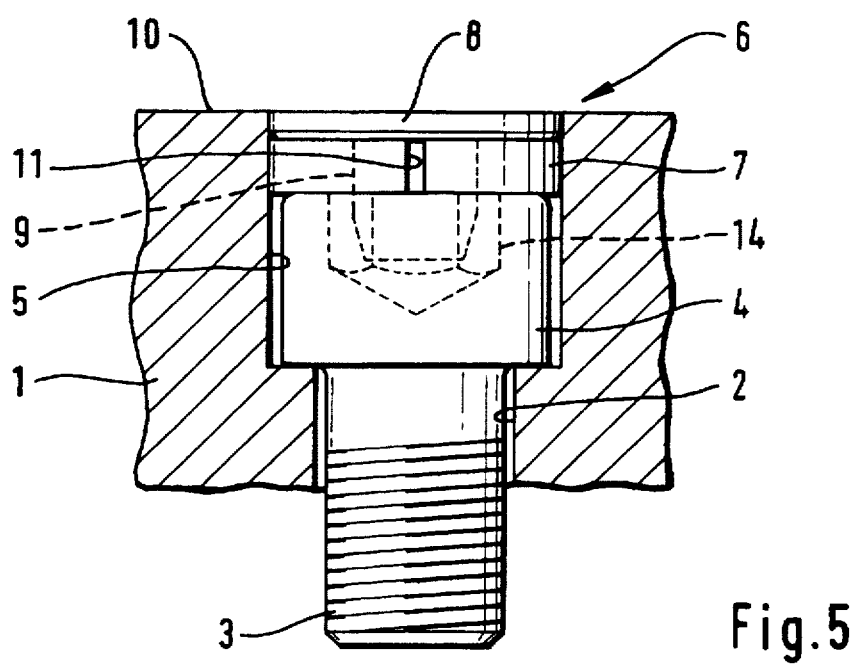
FIG. 5 is a longitudinal cross-section similar to that of FIG. 4 but with the sealing plug pressed into the clamping washer.

To seal the bore 2, the sealing plug 6 is pressed with its shank 9 into the bore 12 of the clamping washer 7 and a chamfer 13 provided on the free end of the shank 9 permits the shank 9 to be introduced into the bore 12. This causes the clamping washer 7 to be radially expanded so that its outer peripheral surface comes to bear against the inner surface of the end portion 5 of the bore 2 and the clamping washer 7 is thus clamped in position. The shank 9 is pressed into the bore 12 till the disc-shaped upper portion 8 is located completely within the end portion 5 with, as shown in FIG. 5, its outer end face flush with the upper surface 10 of the guide rail 1 so that the bore 2 is sealed in the outward direction. In this state, the shank 9 extends partially into a polygon socket profile 14 of the screw head 4. With the help of the clamping washer 7, the sealing plug 6 is fixed in a simple manner in the end portion 5 of the bore 2.

Various modifications of the sealing arrangement may be made without departing from the spirit or scope thereof and it is to be understood that the invention is intended to be limited only as defined in the appended claims.

What I claim is:

1. A sealing arrangement for bores (2) in guide rails (1), each bore (2) comprising a radially widened end portion (15) for receiving a screw head (4) of a fixing screw (3) and being adapted to be sealed in a plane parallel to an upper surface (10) of the guide rail (1) by a sealing plug (6) having a disc-shaped upper part (8) and a concentric shank (9), said sealing plug (16) extending in a sealing position in the end portion (5) of the bore (12) an annular clamping washer (7) comprising a through-slit (11) in radial direction at one circumferential point being arranged in the end portion (5) between the upper part (8) of the sealing plug (6) and the screw head (4), and the shank (9) of the sealing plug (6) being pressed into a bore (12) of the clamping washer (7), characterized in that the clamping washer (7) is situated within the end portion (5) of the bore (2) and one end face of the clamping washer (7) bears against the screw head (4) and an outer peripheral surface of the clamping washer (7) bears against an inner surface of the end portion (5) of the bore (2).

2. A sealing arrangement of claim 1 wherein the disc-shaped upper part (8) of the sealing plug (6) has a diameter having a slight play relative to the radially widened portion (5) of the bore (2) of the guide rail (1).

3. A sealing arrangement of claim 1 wherein the screw head (4) comprises a hollow space open at one end and having a polygon socket profile (14) into which the shank (9) of the sealing plug (6) projects.

* * * * *